US012584436B2

(12) United States Patent
Akiyama et al.

(10) Patent No.: US 12,584,436 B2
(45) Date of Patent: Mar. 24, 2026

(54) ENGINE COOLING DEVICE

(71) Applicant: TOYOTA JIDOSHA KABUSHIKI KAISHA, Toyota (JP)

(72) Inventors: Shoichi Akiyama, Toyota (JP); Takenori Saoda, Okazaki (JP); Masazumi Yoshida, Kariya (JP); Hirokazu Tanaka, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/987,256

(22) Filed: Dec. 19, 2024

(65) Prior Publication Data

US 2025/0250926 A1 Aug. 7, 2025

(30) Foreign Application Priority Data

Feb. 7, 2024 (JP) ................................ 2024-017145

(51) Int. Cl.

*F01P 7/00* (2006.01)
*F01N 3/02* (2006.01)
*F01P 3/02* (2006.01)
*F01P 3/12* (2006.01)
*F01P 5/10* (2006.01)
*F01P 7/16* (2006.01)
*F02M 26/22* (2016.01)

(52) U.S. Cl.

CPC .............. *F01P 7/16* (2013.01); *F01N 3/0205* (2013.01); *F01P 3/02* (2013.01); *F01P 3/12* (2013.01); *F01P 5/10* (2013.01); *F02M 26/22* (2016.02); *F01P 2003/024* (2013.01); *F01P 2005/105* (2013.01); *F01P 2025/08* (2013.01)

(58) Field of Classification Search

CPC ........ F01P 7/165; F01P 3/02; F01P 2003/027; F01P 2005/105; F01P 2003/028; F01P 2003/024; F02F 1/40; F02F 1/14; B60H 1/00885; F02M 26/28

USPC ...................................................... 123/41.02

See application file for complete search history.

(56) References Cited

U.S. PATENT DOCUMENTS 9,500,115 B2 * 11/2016 Quix ........................ F01P 7/165
9,677,458 B2 * 6/2017 Mushiga ................... F01P 5/12
(Continued)

FOREIGN PATENT DOCUMENTS

JP 2023-97991 A 7/2023

*Primary Examiner* — Hung Q Nguyen
*Assistant Examiner* — James J Kim
(74) *Attorney, Agent, or Firm* — Oblon, McClelland, Maier & Neustadt, L.L.P.

(57) ABSTRACT

An engine cooling device includes: a block lower portion that is a lower portion of a cylinder block; a block upper portion that is an upper portion of the cylinder block; a cylinder head of the engine; an exhaust cooling portion that cools an exhaust gas of the engine; a radiator that dissipates heat of a coolant; a first path that bypasses the radiator to cause the coolant to circulate through the block lower portion, the block upper portion, the cylinder head, and the exhaust cooling portion; a second path that bypasses the block lower portion to cause the coolant to circulate through the radiator, the block upper portion, the cylinder head, and the exhaust cooling portion; and a flow rate control mechanism that increases a flow rate of the coolant flowing through the second path with respect to a flow rate of the coolant flowing through the first path.

5 Claims, 9 Drawing Sheets

(56) References Cited

U.S. PATENT DOCUMENTS

| | | | | |
|---|---|---|---|---|
| 2012/0216761 | A1* | 8/2012 | Takahashi | F01P 7/16 123/41.82 R |
| 2019/0234292 | A1* | 8/2019 | Gonze | F01P 5/10 |
| 2020/0040804 | A1* | 2/2020 | Nam | F01P 7/16 |
| 2021/0123373 | A1* | 4/2021 | Park | F01P 5/10 |
| 2023/0203980 | A1 | 6/2023 | Takagi et al. | |

* cited by examiner

ENGINE COOLING DEVICE

CROSS-REFERENCE TO RELATED APPLICATION

This application claims priority to Japanese Patent Application No. 2024-017145 filed on Feb. 7, 2024, incorporated herein by reference in its entirety.

BACKGROUND

1. Technical Field

The disclosure relates to an engine cooling device.

2. Description of Related Art

An engine cooling device that cools an engine by a coolant is known (see, for example, Japanese Unexamined Patent Application Publication No. 2023-097991).

SUMMARY

When the temperature rise of a cylinder block or a cylinder head of an engine is slow before completion of warm-up, unburned fuel may increase in amount to cause reduction of fuel efficiency. Further, when the temperature excessively rises in an upper portion of the cylinder block and the cylinder head of the engine and an exhaust cooling portion after the completion of the warm-up, knocking is liable to occur to cause reduction of the fuel efficiency.

In view of the foregoing, the disclosure has an object to provide an engine cooling device with which the reduction of fuel efficiency is prevented.

The above-mentioned object can be achieved by an engine cooling device including: a block lower portion that is a lower portion of a cylinder block of an engine; a block upper portion that is an upper portion of the cylinder block; a cylinder head of the engine; an exhaust cooling portion that cools an exhaust gas of the engine; a radiator that dissipates heat of a coolant; a first path that bypasses the radiator to cause the coolant to circulate through the block lower portion, the block upper portion, the cylinder head, and the exhaust cooling portion; a second path that bypasses the block lower portion to cause the coolant to circulate through the radiator, the block upper portion, the cylinder head, and the exhaust cooling portion; and a flow rate control mechanism that increases a flow rate of the coolant flowing through the second path with respect to a flow rate of the coolant flowing through the first path when a temperature of the coolant flowing through the first path is equal to or more than a warm-up completion temperature, as compared to a case in which the temperature of the coolant is less than the warm-up completion temperature.

The engine cooling device may further include an EGR cooler that cools an EGR gas of the engine, and each of the first path and the second path may cause the coolant to circulate further through the EGR cooler.

The first path may cause the coolant that has passed through the exhaust cooling portion and the cylinder head to flow into the EGR cooler.

The second path may include a path that causes the coolant to circulate from the radiator to the block upper portion and the EGR cooler, and a path that causes the coolant to circulate from the radiator to the cylinder head and the exhaust cooling portion.

The flow rate control mechanism may include a first water pump disposed on the first path, and a second water pump disposed on the second path.

The engine cooling device with which the reduction of the fuel efficiency is prevented can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
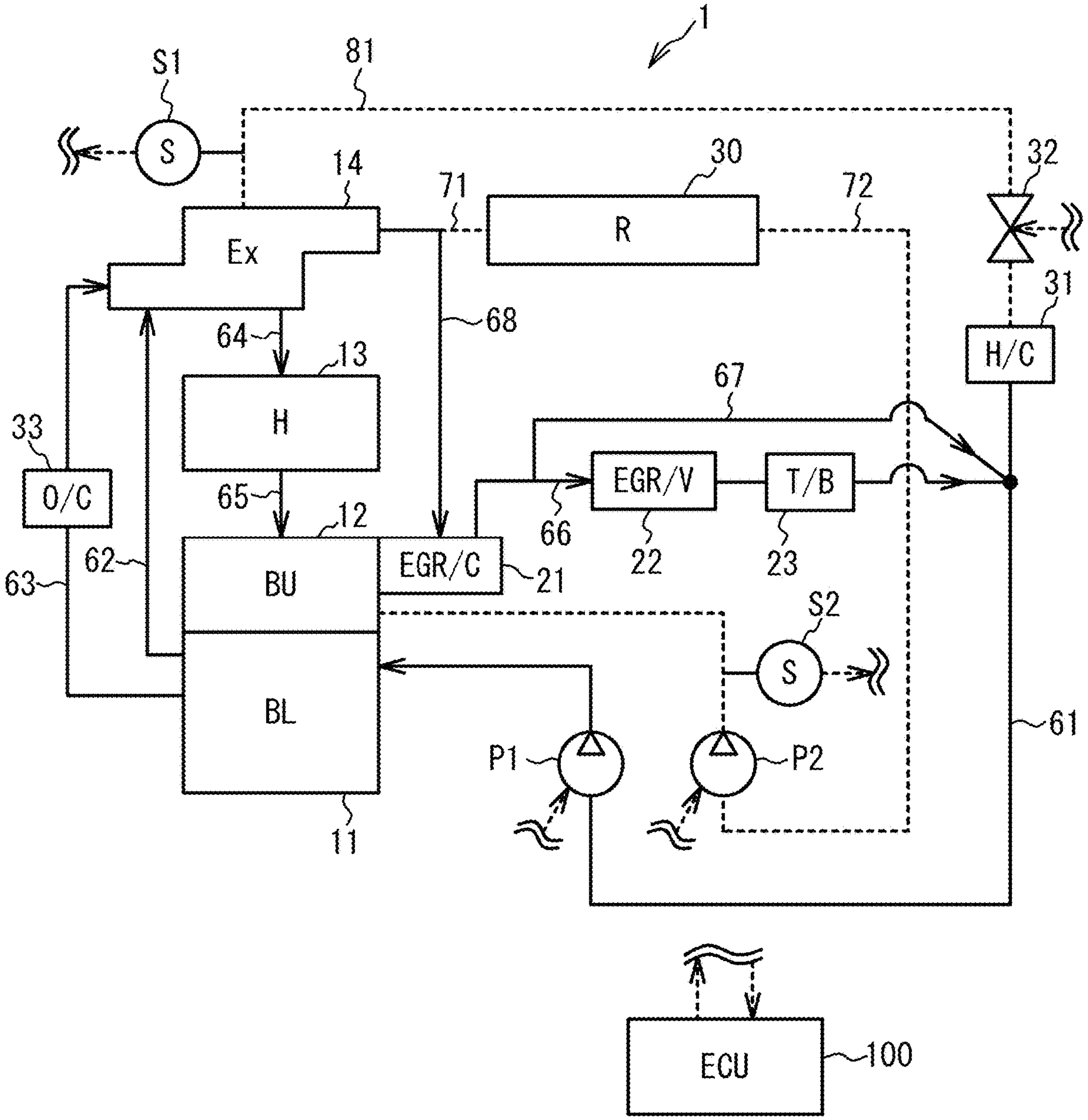
FIG. 1 is an explanatory diagram of an engine cooling device of a first embodiment.
Figure 2:
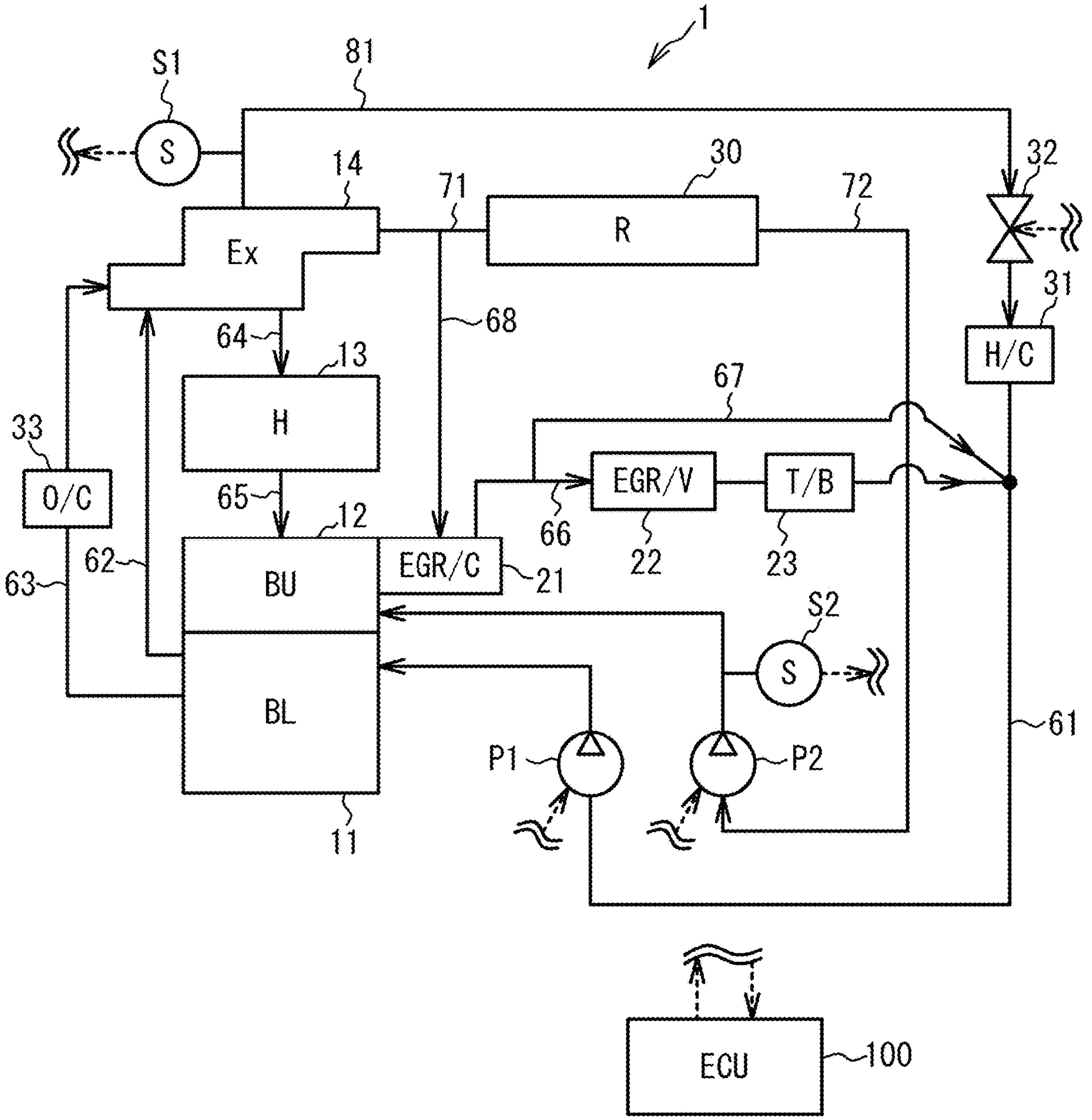
FIG. 2 is an explanatory diagram of the engine cooling device of the first embodiment.
Figure 3:
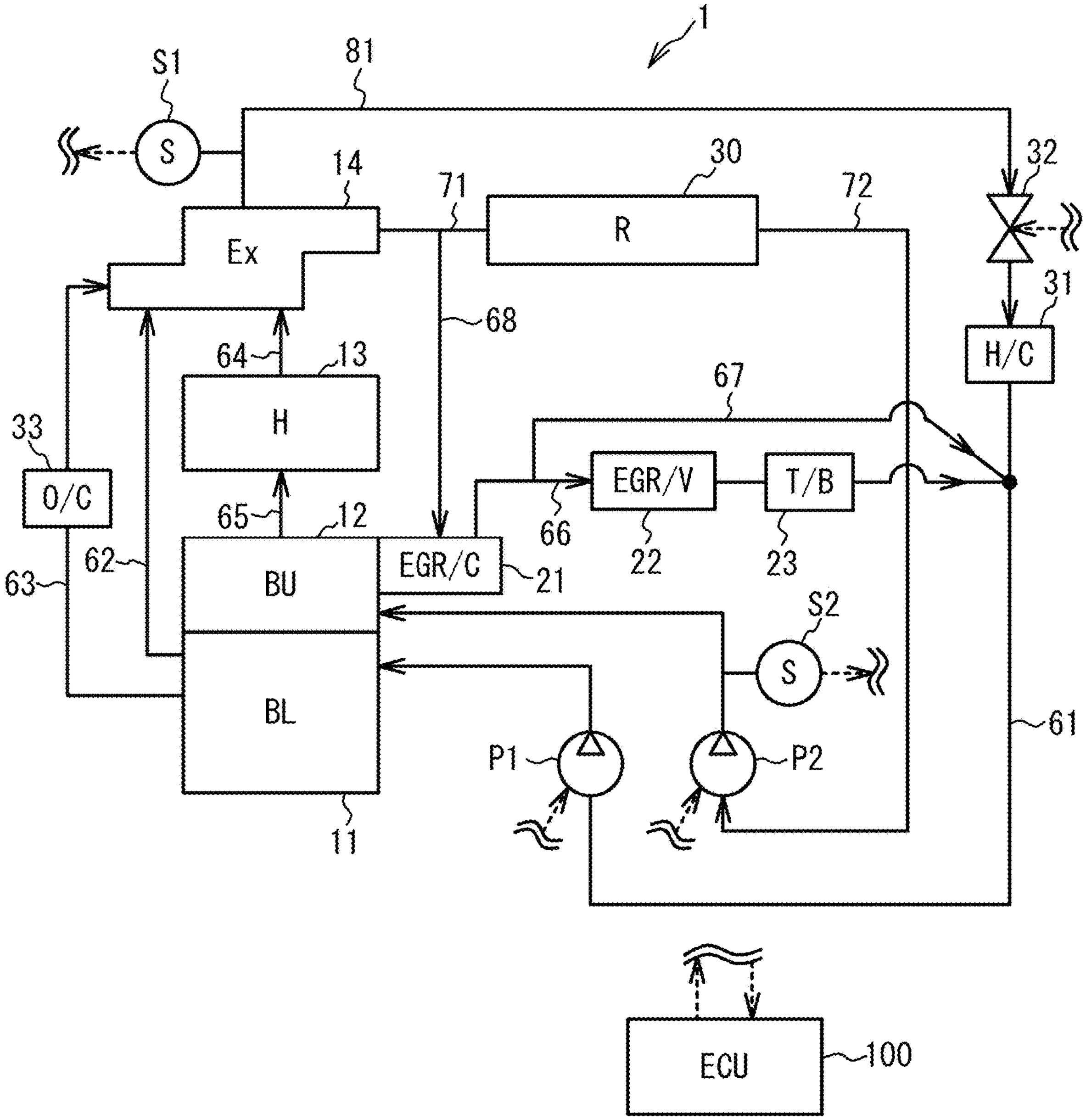
FIG. 3 is an explanatory diagram of the engine cooling device of the first embodiment.

FIG. 1 to FIG. 3 are explanatory diagrams of an engine cooling device 1 of a first embodiment. The engine cooling device 1 is to be mounted on, for example, a vehicle. The engine cooling device 1 includes a block lower portion 11, a block upper portion 12, a cylinder head 13, an exhaust cooling portion 14, an EGR cooler 21, an EGR valve 22, a throttle body 23, a radiator 30, a heater core 31, an on-off valve 32, an oil cooler 33, water pumps P1, P2, temperature sensors S1, S2, and an electronic control unit (ECU) 100. The block lower portion 11 is a lower portion of a cylinder block of an engine. The block upper portion 12 is an upper portion of the cylinder block of the engine. A jacket through which a coolant flows in the block lower portion 11 and a jacket through which the coolant flows in the block upper portion 12 are separated from each other. The cylinder head 13 is fixed to an upper portion of the block upper portion 12. The exhaust cooling portion 14 is provided at an outer peripheral portion of an exhaust manifold connected to the cylinder head 13. When the coolant flows through the exhaust cooling portion 14, heat exchange between the coolant and an exhaust gas is performed so that the exhaust gas is cooled. The EGR cooler 21 is provided on an outer peripheral portion of an exhaust gas recirculation (EGR) tube. When the coolant flows inside of the EGR cooler 21, heat exchange between the coolant and an EGR gas is performed so that the EGR gas is cooled. The EGR cooler 21 is connected to the block upper portion 12. The EGR valve 22 adjusts the flow rate of the EGR gas. The throttle body 23 is a main body portion of an intake valve that adjusts an intake air amount. The radiator 30 promotes the heat exchange between outside air and the coolant to cool the coolant. The heater core 31 promotes the heat exchange between air in a vehicle cabin and the coolant to heat the inside of the vehicle cabin. The on-off valve 32 permits or blocks the inflow of the coolant to the heater core 31. The oil cooler 33 cools an engine oil through heat exchange between the coolant and the engine oil.

The ECU 100 is an electronic control unit including an arithmetic processing circuit that performs various types of arithmetic processing related to driving control of the vehicle, and a memory having a program or data for control stored therein. The ECU 100 acquires the temperature of the coolant based on the temperature sensor S1 and the temperature sensor S2. The ECU 100 controls the water pumps P1, P2 and the on-off valve 32. It is to be noted that the water pumps P1, P2 are electrically operated. The water pumps P1, P2 are an example of a flow rate control mechanism. The water pump P1 is an example of a first water pump. The water pump P2 is an example of a second water pump.

A path 61 is connected to the block lower portion 11. The water pump P1 is provided on the path 61. The water pump P1 pumps the coolant to the block lower portion 11 via the path 61. A path 62 provides communication between the block lower portion 11 and the exhaust cooling portion 14. A path 63 provides communication between the block lower portion 11 and the exhaust cooling portion 14 via the oil cooler 33. A path 64 provides communication between the exhaust cooling portion 14 and the cylinder head 13. A path 65 provides communication between the cylinder head 13 and the block upper portion 12. A path 66 provides communication between the EGR cooler 21 and the path 61 via the EGR valve 22 and the throttle body 23. A path 67 branches from between the EGR cooler 21 and the EGR valve 22 of the path 66 to be connected to the path 61. A path 71 provides communication between the exhaust cooling portion 14 and the radiator 30. A path 68 branches from the path 71 to be connected to the EGR cooler 21. A path 72 provides communication between the radiator 30 and the block upper portion 12. The water pump P2 is provided on the path 72. The water pump P2 pumps the coolant to the block upper portion 12 via the path 72. The temperature sensor S2 is provided on the path 72.

A path 81 provides communication between the exhaust cooling portion 14 and the path 61. The on-off valve 32 and the heater core 31 are provided on the path 81. The temperature sensor S1 is provided between the exhaust cooling portion 14 and the on-off valve 32 of the path 81. It is to be noted that, in more detail, the temperature sensor S1 is provided on a path (not shown) that bypasses the on-off valve 32 and the heater core 31 and provides communication between the path 81 and the path 61. Accordingly, the temperature sensor S1 detects the temperature of the coolant from the exhaust cooling portion 14 even when the on-off valve 32 is closed. Thus, the temperature sensor S1 detects the temperature of the coolant circulating through a first path to be described in detail later.

FIG. 1 illustrates a circulation state of the coolant when the temperature of the coolant detected by the temperature sensor S1 is less than a warm-up completion temperature. Before completion of warm-up, the ECU 100 drives the water pump P1 and stops the water pump P2. In FIG. 1, the flow rate of the coolant in the path indicated by the solid line is large, and the flow rate of the coolant in the path indicated by the dotted line is small. In this state, the coolant flows into the block lower portion 11 via the path 61. A part of the coolant that has flowed into the block lower portion 11 flows into the exhaust cooling portion 14 via the path 62. A part of the coolant that has flowed into the block lower portion 11 flows into the oil cooler 33 and the exhaust cooling portion 14 via the path 63. A part of the coolant that has flowed into the exhaust cooling portion 14 flows into the cylinder head 13, the block upper portion 12, and the EGR cooler 21 via the paths 64, 65. A part of the coolant that has flowed into the exhaust cooling portion 14 flows into the EGR cooler 21 via a part of the path 71 and the path 68. A part of the coolant that has flowed into the EGR cooler 21 flows through the EGR valve 22 and the throttle body 23 via the path 66 to flow into the path 61. A part of the coolant that has flowed into the EGR cooler 21 flows into the path 61 via the path 67. The paths 61, 62, 63, 64, 65, 66, 67, 68, and a part of the path 71 are an example of the first path.

In the exhaust cooling portion 14, the coolant is increased in temperature by the exhaust gas. A high-temperature coolant whose temperature is increased as described above flows into the cylinder head 13, the block upper portion 12, and the block lower portion 11 so that the temperature rise of those portions is promoted. Thus, the increase in amount of the unburned fuel in the combustion chamber is prevented, and thus the reduction of the fuel efficiency is prevented. Further, the coolant that has become a high-temperature coolant after passing through the exhaust cooling portion 14, the cylinder head 13, and the block upper portion 12 flows into the EGR cooler 21. Thus, the temperature rise of the EGR cooler 21 is promoted, and thus it is possible to prevent generation of condensed water in the EGR tube due to inflow of the a low-temperature coolant into the EGR cooler 21.

Further, the water pump P2 is stopped, and hence the flow rate of the coolant flowing into the radiator 30 is reduced, and thus the temperature rise of the coolant is promoted. Further, the coolant flows into the EGR valve 22, and hence the excessive temperature rise of the EGR valve 22 is prevented. The coolant flows into the throttle body 23, and hence freezing of the throttle body 23 is prevented.

FIG. 2 illustrates a circulation state of the coolant when the temperature of the coolant detected by the temperature sensor S1 is equal to or more than the warm-up completion temperature. After the completion of the warm-up, the ECU 100 drives the water pumps P1, P2. In other words, in FIG. 2, as compared to FIG. 1, the flow rate of the coolant obtained by the water pump P2 with respect to the flow rate of the coolant obtained by the water pump P1 is increased. The water pump P2 is driven, and hence a part of the coolant that has flowed into the exhaust cooling portion 14 flows into the radiator 30 via the path 71. The coolant is cooled in the radiator 30. The coolant that has flowed into the radiator 30 flows into the block upper portion 12 via the path 72. Thus, the excessive temperature rise of the block upper portion 12 is prevented. It is to be noted that the coolant that has flowed into the radiator 30 re-flows into the radiator 30 via the paths 72, 66, 67, 61, 62, 63, and 71. Thus, the paths 72, 66, 67, 61, 62, 63, and 71 are an example of a second path. As described above, there is an overlap between a part of the first path and a part of the second path.

Further, the coolant that has flowed into the radiator 30 does not flow into the block lower portion 11. Accordingly, the temperature drop of the block lower portion 11 is prevented. Thus, the increase in amount of the unburned fuel in the combustion chamber is prevented, and thus the reduction of the fuel efficiency is prevented. Further, a part of the coolant that has been cooled by the radiator 30 flows into the EGR cooler 21, the EGR valve 22, and the throttle body 23 via the block upper portion 12. With the coolant flowing through the EGR cooler 21 and the EGR valve 22, the cooling of the EGR gas is promoted, and thus the reduction of the fuel efficiency is prevented.

When there is a heating request, as illustrated in FIG. 2, the ECU 100 opens the on-off valve 32. Thus, a part of the coolant that has flowed into the exhaust cooling portion 14 flows into the heater core 31 via the path 81. In the heater core 31, heat exchange between the coolant and the air in the vehicle cabin is performed so that the inside of the vehicle cabin is heated. The path 81 is an example of a third path. It is to be noted that, even when there is a heating request before the completion of the warm-up of FIG. 1, the on-off valve 32 may be opened so that the inside of the vehicle cabin is heated.

FIG. 3 illustrates a circulation state of the coolant when the temperature of the coolant detected by the temperature sensor S1 is equal to or larger than the warm-up completion temperature. Here, FIG. 3 illustrates a case in which the temperature of the coolant detected by the temperature sensor S1 is higher than the case of FIG. 2. In FIG. 3, the water pumps P1, P2 are driven similarly to FIG. 2, but, in FIG. 3, the flow rate of the coolant obtained by the water pump P2 with respect to the flow rate of the coolant obtained by the water pump P1 is larger than that of FIG. 2. Accordingly, in FIG. 3, the coolant that has passed through the radiator 30 to flow into the block upper portion 12 flows into the cylinder head 13 via the path 65. The coolant that has flowed into the cylinder head 13 flows into the exhaust cooling portion 14 via the path 64. Thus, the excessive temperature rise of the block upper portion 12, the cylinder head 13, and the exhaust cooling portion 14 can be prevented. For example, the occurrence of knocking can be prevented, and thus the reduction of the fuel efficiency is prevented. In this case, the paths 64, 65 are also included in the second path.

Further, a part of the coolant that has been cooled by the radiator 30 flows into the EGR cooler 21, the EGR valve 22, and the throttle body 23 via the block upper portion 12. Thus, the cooling or the like of the EGR gas is promoted. Further, a part of the coolant that has flowed from the block lower portion 11, the cylinder head 13, and the oil cooler 33 into the exhaust cooling portion 14 flows into the radiator 30 via the path 71. Thus, the cooling of the coolant is promoted.

Second Embodiment

Figure 4:
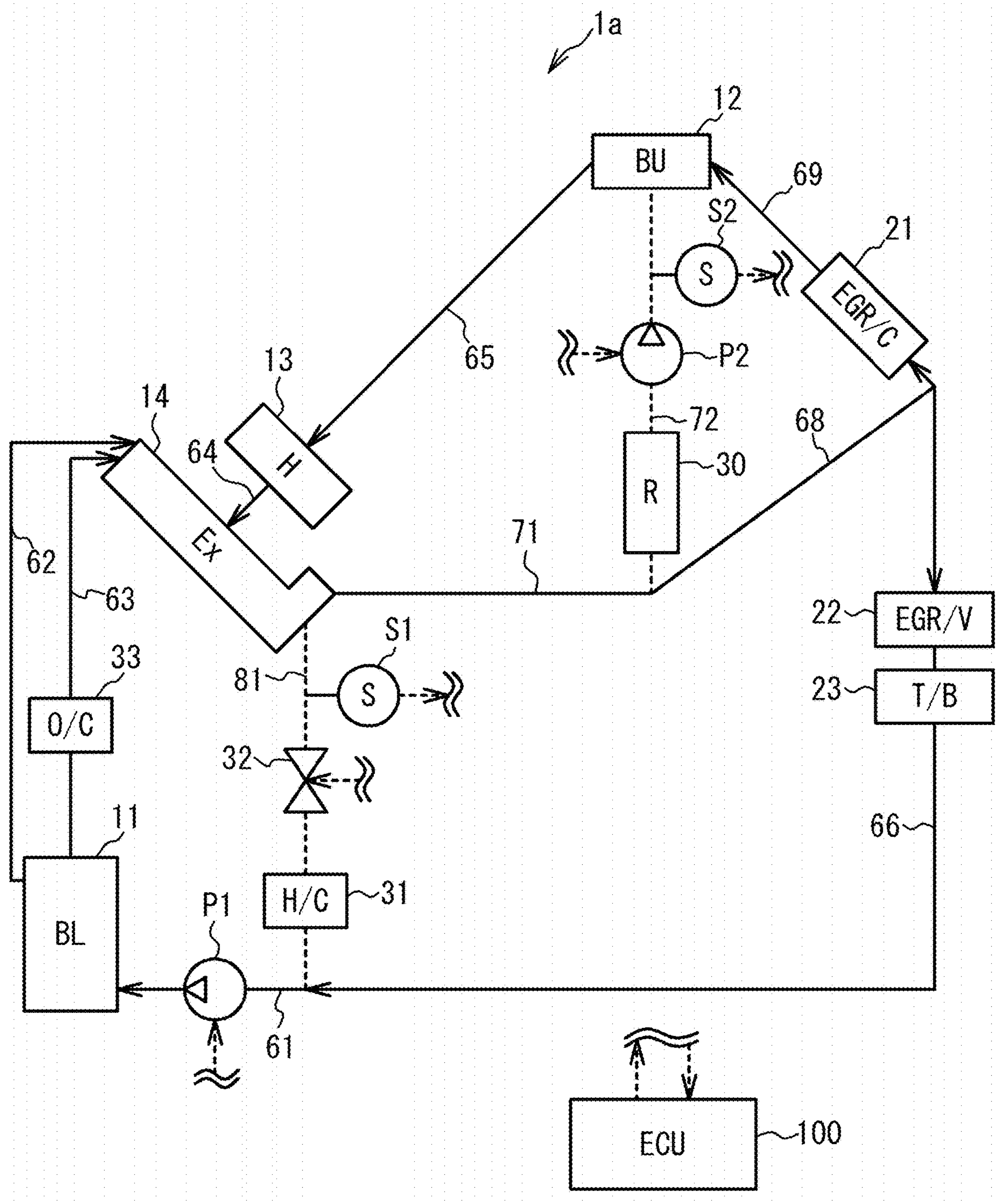
FIG. 4 is an explanatory diagram of an engine cooling device of a second embodiment.
Figure 5:
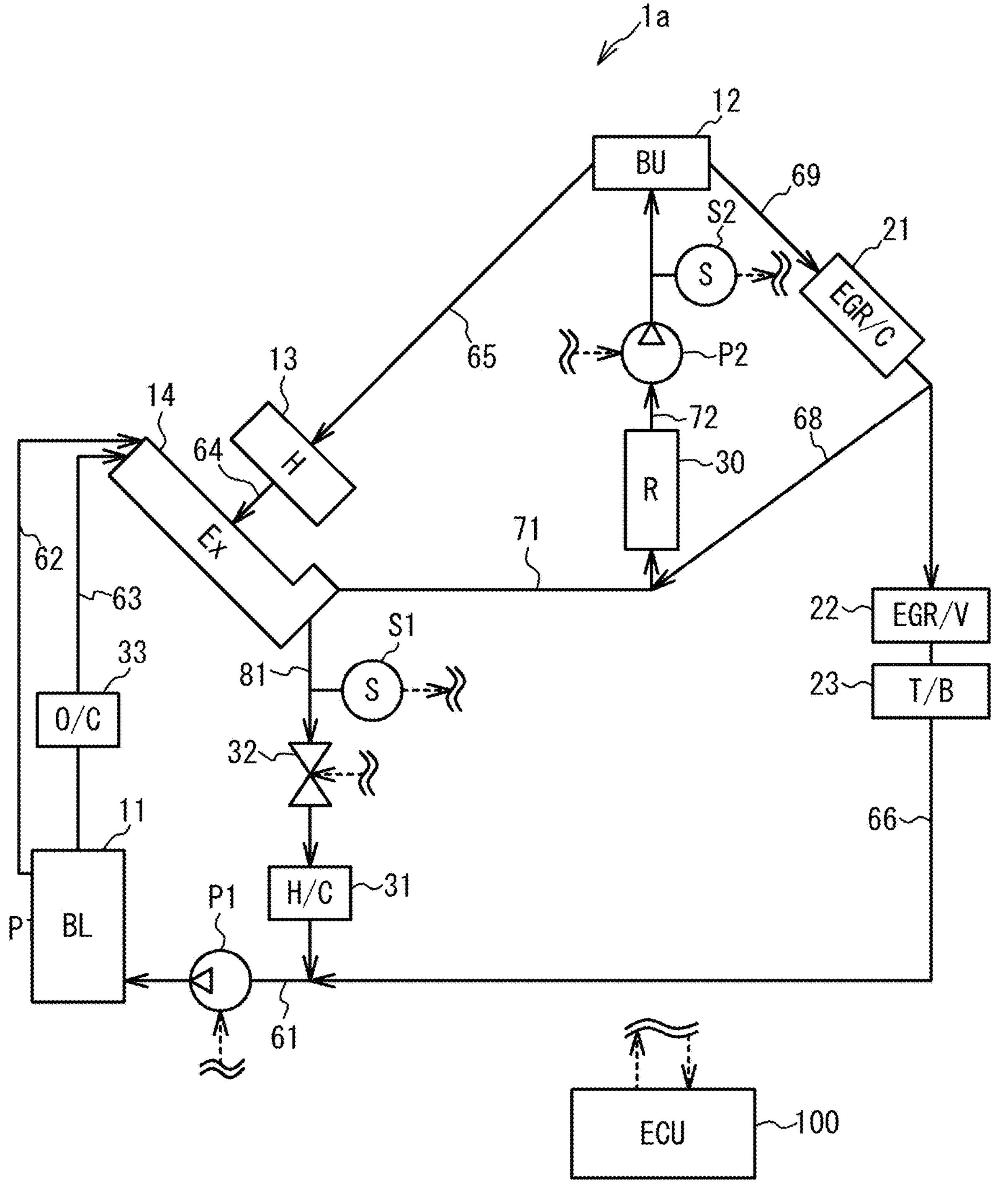
FIG. 5 is an explanatory diagram of the engine cooling device of the second embodiment.

FIG. 4 and FIG. 5 are explanatory diagrams of an engine cooling device 1*a* of a second embodiment. FIG. 4 and FIG. 5 illustrate the block lower portion 11 and the block upper portion 12 in a separated manner for easier understanding. A path 69 provides communication between the EGR cooler 21 and the block upper portion 12. The path 66 is communicated with the path 68. The temperature sensor S1 is provided, in detail, on a path (not shown) that bypasses the on-off valve 32 and the heater core 31 to provide communication between the path 81 and the path 66. Accordingly, the temperature sensor S1 can detect the temperature of the coolant from the exhaust cooling portion 14 even when the on-off valve 32 is closed.

FIG. 4 illustrates a circulation state of the coolant when the temperature of the coolant detected by the temperature sensor S1 is less than the warm-up completion temperature. Before the completion of the warm-up, the ECU 100 drives the water pump P1 and stops the water pump P2. Accordingly, the coolant flows into the block lower portion 11 via the path 61. A part of the coolant that has flowed into the block lower portion 11 flows into the exhaust cooling portion 14 via the path 62. A part of the coolant that has flowed into the block lower portion 11 flows into the oil cooler 33 via the path 63. The coolant that has flowed into the oil cooler 33 flows into the exhaust cooling portion 14. A part of the coolant that has flowed into the exhaust cooling portion 14 flows into the EGR cooler 21 via a part of the path 71 and the path 68. The coolant that has flowed into the EGR cooler 21 flows into the block upper portion 12 via the path 69. The coolant that has flowed into the block upper portion 12 flows into the cylinder head 13 via the path 65. The coolant that has flowed into the cylinder head 13 flows into the exhaust cooling portion 14 via the path 64. Further, a part of the coolant that has flowed into the exhaust cooling portion 14 flows into the EGR valve 22 and the throttle body 23 via a part of the path 71, a part of the path 68, and the path 66. The coolant that has flowed into the EGR valve 22 and the throttle body 23 flows into the block lower portion 11 via the path 66 and the path 61. The paths 61, 62, 63, 64, 65, 66, 67, 68, 69, and a part of the path 71 are an example of the first path.

The coolant that has become a high-temperature coolant in the exhaust cooling portion 14 flows into the block upper portion 12, the cylinder head 13, and the block lower portion 11. Thus, the temperature rise of the block upper portion 12, the cylinder head 13, and the block lower portion 11 is promoted. Further, the coolant that has flowed through the cylinder head 13 and the exhaust cooling portion 14 to become the high-temperature coolant flows into the EGR cooler 21. Thus, the temperature rise of the EGR cooler 21 is promoted.

It is to be noted that, when pressure losses of the coolant in the cylinder head 13, the exhaust cooling portion 14, the block upper portion 12, and the EGR cooler 21 are assumed as R1, R2, R3, and R4, respectively, to establish a Wheatstone bridge circuit, as (R2·R3−R1·R4) is closer to 0, the flow rate of the coolant flowing through the radiator 30 when the water pump P2 is stopped can be reduced. Thus, when each of the above-mentioned pressure losses is adjusted so that the flow rate of the coolant flowing through the radiator 30 when the water pump P2 is stopped is reduced, the temperature rise of the coolant is promoted, and thus the temperature rise of the block lower portion 11, the block upper portion 12, the cylinder head 13, and the EGR cooler 21 is promoted.

FIG. 5 illustrates a circulation state of the coolant when the temperature of the coolant detected by the temperature sensor S1 is equal to or more than the warm-up completion temperature. After the completion of the warm-up, the ECU 100 drives the water pumps P1, P2. A part of the coolant that has been discharged from the exhaust cooling portion 14 flows into the radiator 30 via the path 71. The coolant that has flowed into the radiator 30 flows into the block upper portion 12. A part of the coolant that has flowed into the block upper portion 12 flows into the cylinder head 13 and the exhaust cooling portion 14 via the paths 65, 64. As described above, a part of the coolant that has passed through the radiator 30 flows into the block upper portion 12, the cylinder head 13, and the exhaust cooling portion 14, and the excessive temperature rise of those portions is prevented. Further, a part of the coolant that has flowed into the block upper portion 12 flows into the EGR cooler 21 via the path 69. A part of the coolant that has flowed into the EGR cooler 21 flows into the EGR valve 22 and the throttle body 23 via the path 66. Even with this, the reduction of the fuel efficiency or the like is prevented. The paths 64, 65, 68, 69, 71, 72 are an example of the second path. It is to be noted that, when there is a heating request, as illustrated in FIG. 5, the ECU 100 opens the on-off valve 32. As a result, the inside of the vehicle cabin is heated.

Third Embodiment

Figure 6:
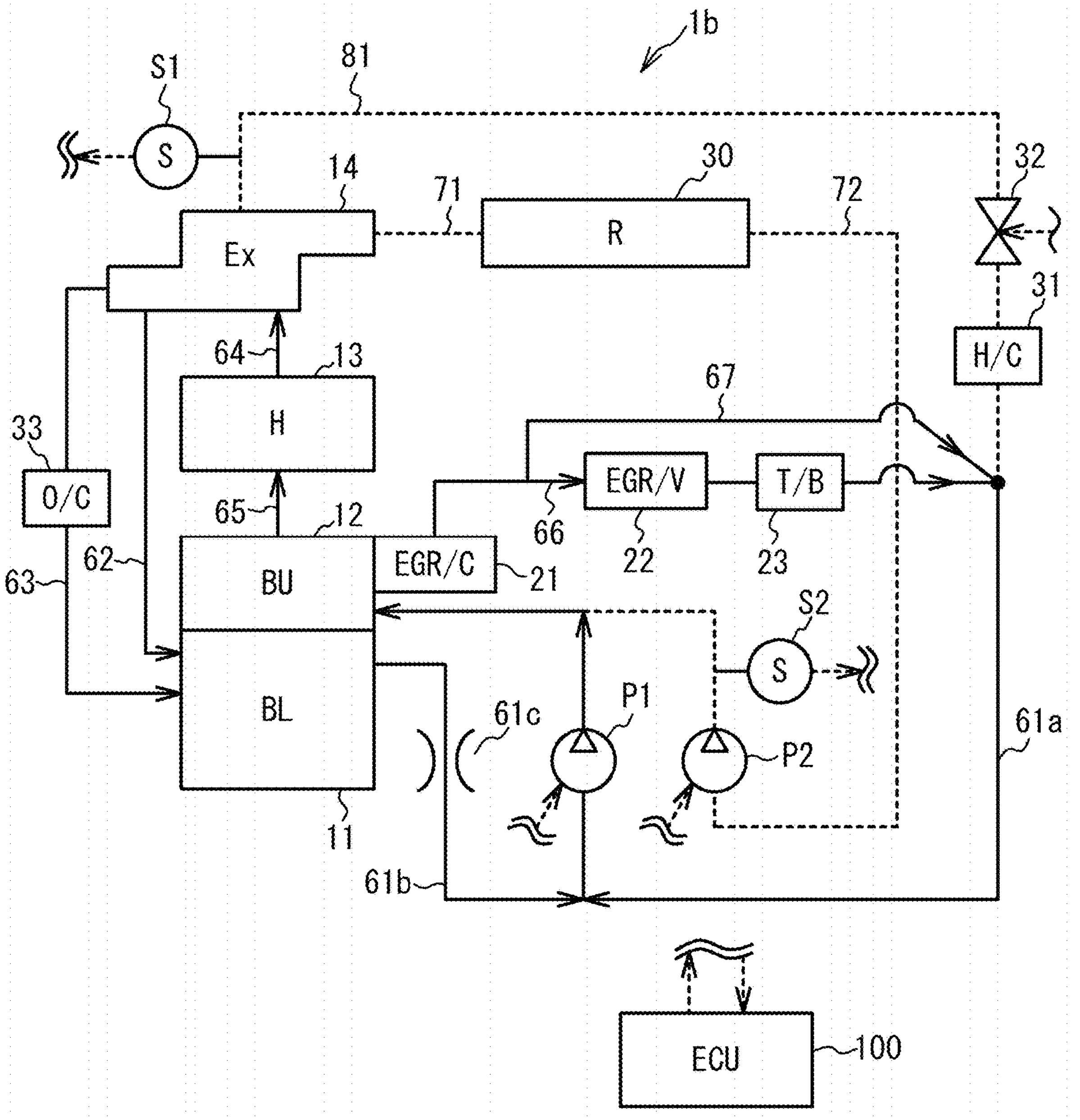
FIG. 6 is an explanatory diagram of an engine cooling device of a third embodiment.
Figure 7:
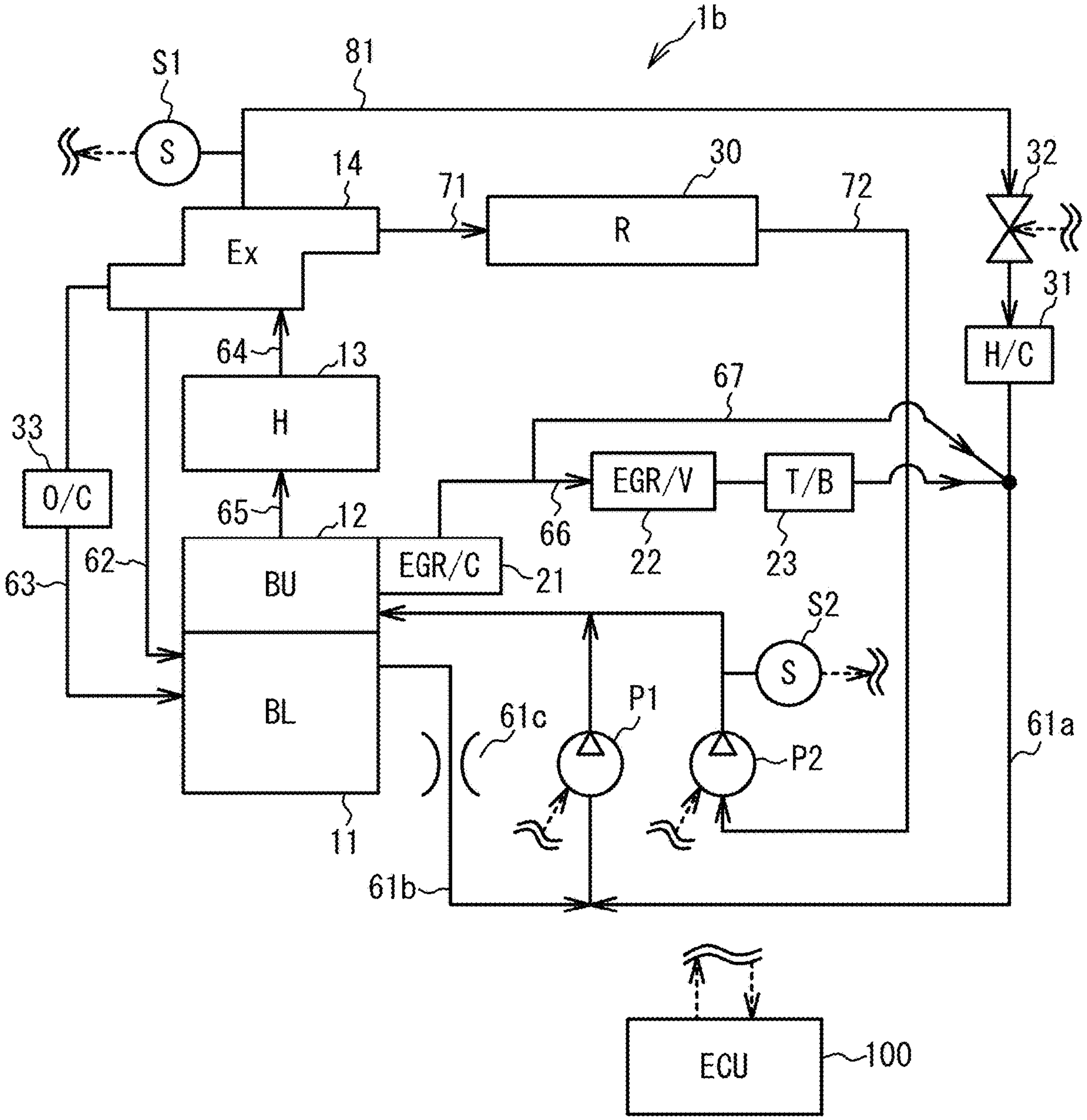
FIG. 7 is an explanatory diagram of the engine cooling device of the third embodiment.

FIG. 6 and FIG. 7 are explanatory diagrams of an engine cooling device 1*b* of a third embodiment. A path 61*a* is communicated with the path 72. In detail, a part of the path 61*a* on the downstream side from the water pump P1 and a part of the path 72 on the downstream side from the water pump P2 are communicated with each other. The water pump P1 is provided on the path 61*a*. A path 61*b* provides communication between the block lower portion 11 and the path 61*a*. In detail, the path 61*b* and a part of the path 61*a* on the upstream side from the water pump P1 are communicated with each other. The path 61*b* has an orifice 61*c* provided for reducing the flow rate of the coolant.

FIG. 6 illustrates a circulation state of the coolant when the temperature of the coolant detected by the temperature sensor S1 is less than the warm-up completion temperature. Before the completion of the warm-up, the ECU 100 drives the water pump P1 and stops the water pump P2. The coolant flows into the block upper portion 12 via the path 61*a* and a part of the path 72. A part of the coolant that has flowed into the block upper portion 12 flows into the EGR cooler 21. A part of the coolant that has flowed into the EGR cooler 21 flows into the EGR valve 22 and the throttle body 23 via the path 66 to flow to the path 61*a*. A part of the coolant that has flowed into the EGR cooler 21 flows into the path 61*a* via the path 67. A part of the coolant that has flowed into the block upper portion 12 flows into the cylinder head 13 and the exhaust cooling portion 14 via the paths 65, 64. The paths 61*a*, 61*b*, 62, 63, 64, 65, 66, 67, and a part of the path 72 are an example of the first path.

The coolant that has flowed into the exhaust cooling portion 14 flows into the block lower portion 11 via the paths 62, 63. The coolant that has flowed into the block lower portion 11 flows into the path 61*a* via the path 61*b*. As described above, the coolant that has become a high-temperature coolant in the exhaust cooling portion 14 flows into the block lower portion 11, the block upper portion 12, and the cylinder head 13. Accordingly, the temperature rise of the block lower portion 11, the block upper portion 12, and the cylinder head 13 is promoted. Further, the path 61*b* has the orifice 61*c*. Thus, the flow rate of the coolant passing through the block lower portion 11 is reduced, and the temperature rise of the block lower portion 11 is promoted.

FIG. 7 illustrates a circulation state of the coolant when the temperature of the coolant detected by the temperature sensor S1 is equal to or more than the warm-up completion temperature. After the completion of the warm-up, the ECU 100 drives the water pumps P1, P2. A part of the coolant that has flowed into the exhaust cooling portion 14 flows into the radiator 30 via the path 71. The coolant that has flowed into the radiator 30 flows into the block upper portion 12 via the path 72. The coolant that has passed through the radiator 30 to flow into the block upper portion 12 flows through the cylinder head 13 and the exhaust cooling portion 14. Thus, the excessive temperature rise of the block upper portion 12, the cylinder head 13, and the exhaust cooling portion 14 is prevented. Further, the coolant that has flowed into the radiator 30 does not flow into the block lower portion 11. Accordingly, the temperature drop of the block lower portion 11 is prevented, and thus the reduction of the fuel efficiency is prevented. The paths 64, 65, 71, and 72 are an example of the second path.

The drive forces of the water pumps P1, P2 may be adjusted so that the flow rate of the coolant flowing through the path 72 with respect to the flow rate of the coolant flowing through the path 61*a* may be increased or decreased. For example, when the temperature detected by the temperature sensor S1 is a high temperature that is equal to or more than the warm-up completion temperature and further is equal to or more than a knocking occurrence temperature, as compared to a case in which the temperature detected by the temperature sensor S1 is equal to or more than the warm-up completion temperature and is further less than the knocking occurrence temperature, the flow rate of the coolant flowing through the path 72 with respect to the flow rate of the coolant flowing through the path 61*a* may be increased. Thus, the flow rate to the block upper portion 12, the cylinder head 13, and the exhaust cooling portion 14 of the coolant that has passed through the radiator 30 to become a low-temperature coolant is ensured, and thus the occurrence of the knocking is prevented.

Fourth Embodiment

Figure 8:
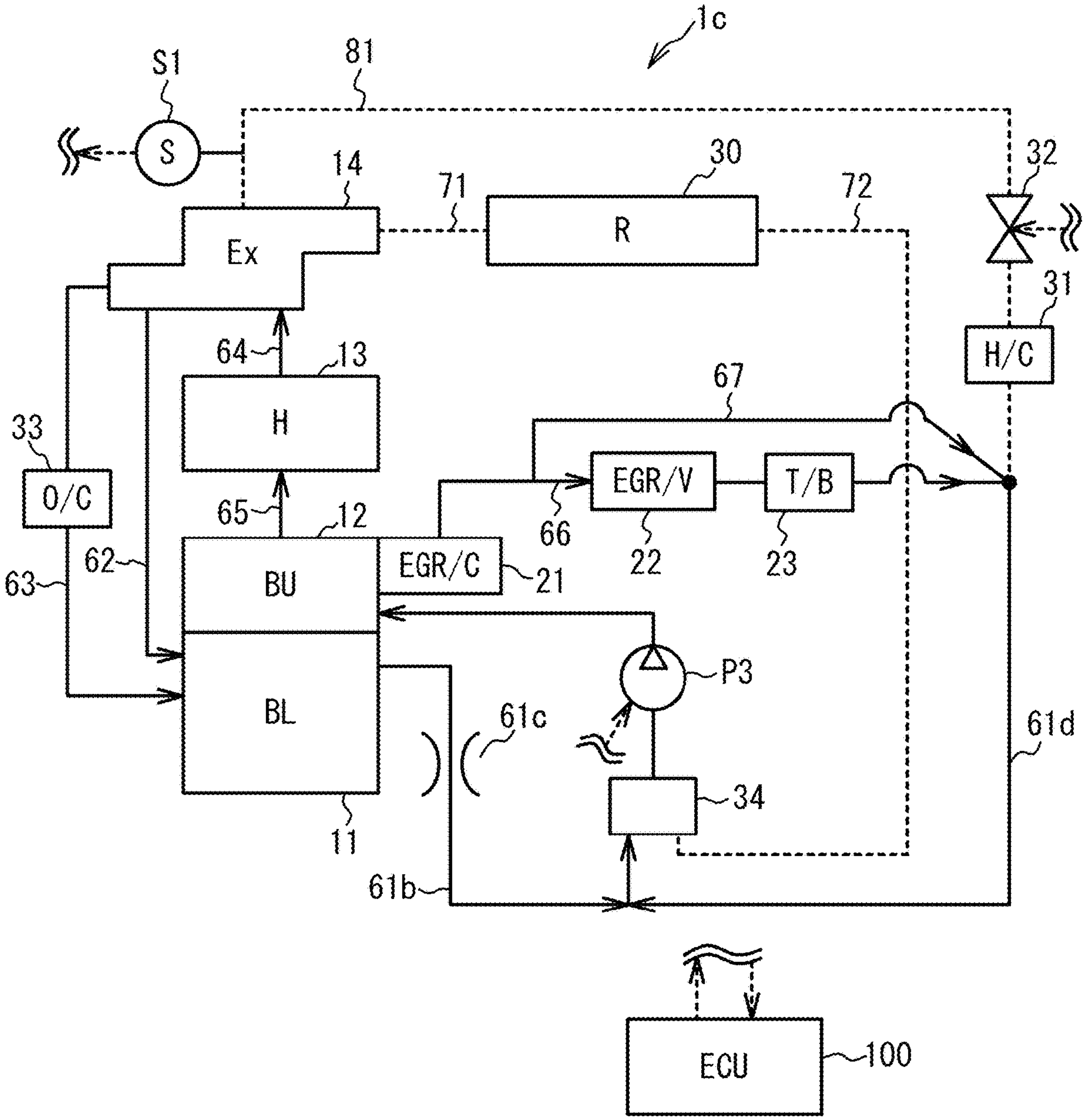
FIG. 8 is an explanatory diagram of an engine cooling device of a fourth embodiment.
Figure 9:
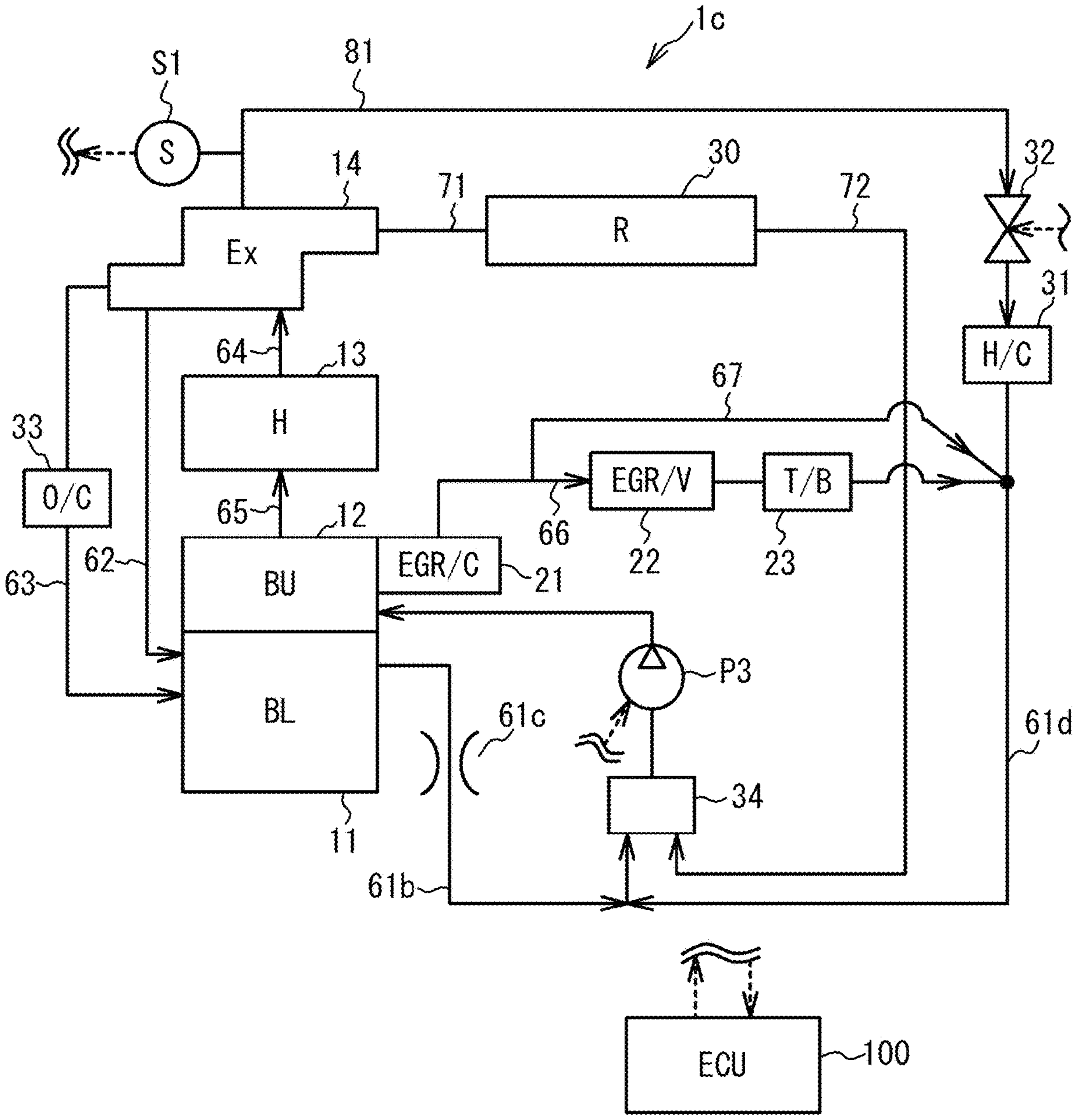
FIG. 9 is an explanatory diagram of the engine cooling device of the fourth embodiment.

FIG. 8 and FIG. 9 are explanatory diagrams of an engine cooling device 1*c* of a fourth embodiment. A thermostat 34 is provided in the path 72. The thermostat 34 is communicated with a path 61*d*. When the temperature of the coolant in the thermostat 34 is less than the warm-up completion temperature, the coolant flows into the thermostat 34 via the path 61*d*. When the temperature of the coolant in the thermostat 34 is equal to or more than the warm-up completion temperature, the coolant flows into the thermostat 34 via the path 61*d*, and the coolant flows into the thermostat 34 via the path 72. The coolant that has flowed into the thermostat 34 flows into the block upper portion 12 via the path 72. Further, a water pump P3 is provided on the downstream side of the path 72 from the thermostat 34. The thermostat 34 and the water pump P3 are an example of the flow rate control mechanism. In the fourth embodiment, a single water pump P3 is provided, and hence, as compared to the case in which two water pumps P1, P2 are provided as in the first to third embodiments described above, the power consumption is reduced.

FIG. 8 illustrates a circulation state of the coolant when the temperature of the coolant detected by the temperature sensor S1 is less than the warm-up completion temperature. Before the completion of the warm-up, the ECU 100 drives the water pump P3, and the thermostat 34 closes the path 72. The coolant flowing through the path 61*d* flows into the thermostat 34, and flows into the block upper portion 12 via a part of the path 72. A part of the coolant that has flowed into the block upper portion 12 flows into the cylinder head 13, the exhaust cooling portion 14, and the block lower portion 11. That is, the coolant that has become a high-temperature coolant in the exhaust cooling portion 14 flows into the block lower portion 11, the block upper portion 12, and the cylinder head 13. Thus, the temperature rise of the block lower portion 11, the block upper portion 12, and the cylinder head 13 is promoted. The paths 61*d*, 61*b*, 62, 63, 64, 65, 66, 67, and a part of the path 72 are an example of the first path.

FIG. 9 illustrates a circulation state of the coolant when the temperature of the coolant detected by the temperature sensor S1 is equal to or more than the warm-up completion temperature. After the completion of the warm-up, the ECU 100 drives the water pump P3, and the thermostat 34 opens the path 72. Thus, the coolant that has passed through the radiator 30 flows into the block upper portion 12, the cylinder head 13, and the exhaust cooling portion 14. Thus, the excessive temperature rise of the block upper portion 12, the cylinder head 13, and the exhaust cooling portion 14 is prevented. The paths 64, 65, 71, and 72 are an example of the second path.

Hereinabove, embodiments of the disclosure have been described in detail, but the disclosure is not limited to the specific embodiments. Various modifications and changes can be made without departing from the gist of the disclosure described in the claims.

What is claimed is:

1. An engine cooling device comprising:

a block lower portion that is a lower portion of a cylinder block of an engine;

a block upper portion that is an upper portion of the cylinder block;

a cylinder head of the engine;

an exhaust cooling portion that cools an exhaust gas of the engine;

a radiator that dissipates heat of a coolant;

a first path that bypasses the radiator to cause the coolant to circulate through the block lower portion, the block upper portion, the cylinder head, and the exhaust cooling portion;

a second path that bypasses the block lower portion to cause the coolant to circulate through the radiator, the block upper portion, the cylinder head, and the exhaust cooling portion; and a flow rate control mechanism that increases a flow rate of the coolant flowing through the second path with respect to a flow rate of the coolant flowing through the first path when a temperature of the coolant flowing through the first path is equal to or more than a warm-up completion temperature, as compared to a case in which the temperature of the coolant is less than the warm-up completion temperature.

2. The engine cooling device according to claim 1, further comprising an EGR cooler that cools an EGR gas of the engine, wherein each of the first path and the second path causes the coolant to circulate further through the EGR cooler.

3. The engine cooling device according to claim 2, wherein the first path causes the coolant that has passed through the exhaust cooling portion and the cylinder head to flow into the EGR cooler.

4. The engine cooling device according to claim 3, wherein the second path includes a path that causes the coolant to circulate from the radiator to the block upper portion and the EGR cooler, and a path that causes the coolant to circulate from the radiator to the cylinder head and the exhaust cooling portion.

5. The engine cooling device according to claim 4, wherein the flow rate control mechanism includes a first water pump disposed on the first path, and a second water pump disposed on the second path.

* * * * *